_United States Patent Office_

3,592,785
Patented July 13, 1971

3,592,785
METHOD OF MAKING POLYETHYLENE FOAM
William A. Patterson, Spartanburg, S.C., Stanley Norman Weissman, Cedar Grove, N.J., and Henry G. Schirmer, Spartanburg, S.C., assignors to W. R. Grace & Co., Duncan, S.C.
No Drawing. Continuation of application Ser. No. 307,340, Sept. 9, 1963, now Patent No. 3,432,447. This application Dec. 5, 1968, Ser. No. 781,599
Int. Cl. C08f 3/04, 29/04, 47/10
U.S. Cl. 260—2.5R     5 Claims

ABSTRACT OF THE DISCLOSURE

A process for preparing polyethylene foam consisting essentially of forming a mixture of solid polyethylene and normally solid, heat decomposable organic foaming agent having a decomposition temperature at least about 10° C. above the melting point of the polyethylene material; subjecting said admixture to high energy ionizing radiation to produce a percent gel of about 30 to about 80; heating the irradiated body in stages, first at a temperature slightly below the decomposition point of the foaming agent and immediately thereafter rapidly heating to a temperature well above the decomposition point to form an expanded body and cooling the heated body to a temperature below the freezing point of the polyethylene.

---

This application is a continuation of my copending application, Ser. No. 307,340, filed Sept. 9, 1963, now Pat. No. 3,432,447.

This invention relates to foamable plastic bodies, foams prepared therefrom, and to methods of making each. In particular, the invention relates to foamable bodies of polyethylene material, polyethylene foams prepared therefrom and methods of making.

Polyethylene foams are known in the art. Depending upon their properties, particularly their density (which may range from as low as about .03 gram per cubic centimeter to about 0.8 gram per cubic centimeter), they find wide utility in various industries. Thus, foamed polyethylene has been used as electrical insulation, thermal insulation, gasketing and sealing material (for cable buoys, life jackets and the like) and for a wide variety of other purposes.

It is an object of this invention to provide improved foamable polyethylene bodies having utility in one or more of the above described areas.

It is another object of this invention to provide methods for preparing the improved foamable polyethylene bodies.

A specific object of the invention is to provide methods for preparing foamable polyethylene bodies which upon application of heat and in the absence of restraint will exhibit three dimensional expansion to form foamed polyethylene bodies having excellent resistance to thermal deformation; a uniform smooth surface skin; and a uniform unicellular structure wherein individual cells are substantially spherical and extremely small.

Still another object of the invention is to provide new and improved polyethylene foams characterized especially by uniform, unicellular, substantially spherical and extremely small cells.

Another object is to provide methods for making and for shaping such foams.

Still other objects and advantages of the invention will become apparent to those skilled in the art in view of the following more detailed description.

It has been discovered that improved foamable polyethylene bodies can be prepared by (a) forming a homogeneous admixture of (1) a normally solid polyethylene material and (2) from about 1 to about 15 parts (by weight) per 100 parts (by weight) of the said material of a normally solid, heat decomposable, organic foaming agent having a decomposition temperature at least about 10° centigrade above the melting point of the polyethylene material while (b) maintaining the materials being admixed below the decomposition temperature of the foaming agent; (c) subjecting the admixture to high energy ionizing radiation in an amount corresponding to a total dosage of from about 10 to about 50 megarads and sufficient to provide a percent gel of from about 30 to about 80 percent in the irradiated material.

As an optional ingredient there may be added to any of the above admixtures from about 5 to about 40 parts (by weight) per 100 parts (by weight) of the polyethylene material of a normally solid thermoplastic homopolymer or copolymer of monovinyl aromatic hydrocarbns. Typical examples of such optional additives are homopolymers of styrene, ethylvinylbenzene, isopropylstyrene, vinylxylene, vinyltoluene and copolymers of any two or more of these aromatic hydrocarbons. The addition of any of these additives significantly increases the stiffness of foamed shapes (e.g., trays, bowls, cups, etc.) made from the foamable bodies of this invention and thus broadens the range of useful applications for the foamable bodies. In addition, under certain conditions, the additives assist in producing foams having smaller average cell size. The preferred additive polymer is polystyrene.

The foamable polyethylene bodies of the invention consist essentially of the irradiated homogeneous admixtures described above.

The new and improved polyethylene foams of this invention are prepared by heating the foamable bodies above the decomposition temperature of the foaming agent for a sufficient period of time to decompose substantially all of the foaming agent and then cooling the foam to temperatures below the solidification temperature of the polyethylene material therein.

The term "polyethylene material" as used herein is intended to include normally solid homopolymers of ethylene; copolymers of ethylene with one or more alpha mono-olefins having from 3 to 8 carbon atoms, e.g., propylene, butene-1, 4-methyl-pentene-1, hexene-1, etc.; and physical mixtures of ethylene homopolymer or copolymer with another ethylene homopolymer or copolymer having a different density, or of ethylene homopolymer or copolymer with one or homopolymers on copolymers of the above alpha monoolefins. It is required that the polyethylene material, when composed of a copolymer or one of the above-mentioned physical mixtures, contain a predominant amount, i.e., about 75% or more, by weight, of polymerized ethylene.

The density and molecular weight of the polyethylene material are not critical factors. Thus, the density may range form about .900 or so up to about .980. Molecular weights may range from about 7,000 or 8,000 up to 1,000,000 or 2,000,000 or higher. For optimum results, however, it is preferred to use materials having higher densities (e.g., about 0.940 or higher) or higher molecular weights (e.g., materials having melt indices (as measured in the standard tests) less than about 15.0). In general it can be said that the higher the molecular weight of the polyethylene material, the higher the gel percentage will be at a given radiation dosage. Cell size in the ultimate foam is in turn smaller because of the increased gel percent. Higher density materials have higher crystalline content and hence yield stiffer, tougher foams. It is preferred to use materials having both higher density and higher molecular weight.

The polyethylene material, per se, is not a part of the present invention, since the invention is applicable to various of the polyethylene materials that are commercially available. Typical examples of such materials are high, medium or low density polyethylenes produced either by the high or low pressure processes, both of which processes are now well known to those skilled in the art. Some of the copolymers that can be used, e.g., ethylene-propylene and ethylene-butene copolymers are also commercially available. The physical mixtures useful for this invention include mixtures of ethylene homopolymers having diverse densities and/or diverse molecular weights, mixtures of such ethylene homopolymers with various of the ethylene-alpha olefin copolymers or with propylene homopolymer, and mixtures of such copolymers with each other or with propylene homopolymer.

The foaming agent used in the practice of this invention is a normally solid heat-decomposable organic foaming agent which has a decomposition temperature at least about 10° centigrade above the melting point of the polyethylene material. It will be apparent that the choice of foaming agent for any particular system will depend upon the polyethylene material utilized. Several commercially available materials having high decomposition temperatures permitting universal utilization in the practice of this invention are azobisformamide (Celogen AZ—also called azodicarbonamide), N,N'-dinitrosopentamethylene tetramine (Unicel NDX), p,p'-oxybis (benzenesulfonyl-semicarbazide) (Celogen BH), trihydrazino-symtriazine (THT—see German Pat. 1,001,488), bis-benzenesulfonylhydrazide (BBSH) and barium azodicarboxylate (Expandex 177). Foaming agents with lower decomposition temperatures and hence useful only with low melting temperature polyethylene materials include p,p'-oxybis (benzene-sulfonyl hydrazide) (Celogen), azobis(isobutyronitrile) (Genitron AZDN), and benzene-1,3-disulfonyl hydrazide (Porofor B-13).

The use of azobisformamide is highly preferred because of its ease of incorporation; controllable blowing action; colorless, non-toxic residue and other desirable properties.

In accordance with this invention the amount of foaming agent used ranges from about 1 to about 15 parts, preferably from about 2 to about 8 parts, per 100 parts of polyethylene material, all parts being expressed as parts by weight.

It will be understood that small amounts, e.g., 0.1% to 2.0% or so (by weight) of other additives such as conventional polyethylene antioxidants, pigments, and cell nucleation agents can be included within the compositions used to prepare the foamable bodies of this invention. Suitable materials serving these purposes are well known to those skilled in the art.

The foamable polyethylene bodies are prepared by forming an intimate, essentially homogeneous admixture of the above ingredients, optionally preliminarily shaping the mixture, and then irradiating to the required dosage and gel content. The homogeneous admixture can be obtained by various methods well known to the art. Suitable apparatus includes two-roll mills, Banbury mixers, twin-screw or single screw extruders of various design and other like hot-mixing machines. In hot mixing, the temperature at which the homogeneous admixture is formed is below the decomposition temperature of the solid organic foaming agent. Homogeneous admixtures can also be formed by dry-tumbling the ingredients in powdered or particulate form at room temperature or thereabout. The dry-mixed admixture can then, prior to irradiation, be shaped in any desired manner as by compression molding, injection molding, extruding, etc., at temperatures below the decomposition temperature of the foaming agent.

In accordance with the invention the admixture is then subjected to high energy ionizing radiation. "High energy ionizing irradiation" is a term well known in the art. In accordance with this invention, such irradiation can be accomplished with any of a wide variety of sources including radioactive materials, gamma-ray sources, linear electron beam accelerators (e.g., the Van de Graff accelerators), resonance transformer type cathode ray machines, linear electron beam accelerators, atomic piles and waste fission materials, X-ray machines, betatrons, neutron sources and the like.

The time of irradiation is generally not critical. The time is, of course, that sufficient to obtain the necessary dosage and gel content. For extended radiation periods, protection from oxidation will usually be required. At higher dosages the time must not be so short as to heat the body above about 170° centigrade. For the great majority of cases, using conventional radiation sources, the required dosage and gel content is obtained long before any temperature rise of this order occurs.

The irradiation can be carried out at room temperature or at elevated temperatures up to about 100° centigrade. Room temperature is usually preferred for economic reasons. Slightly higher efficiencies are obtained at more elevated irradiation temperatures in the noted range, but this is largely offset by the need for protection from oxidation.

The irradiation must in all cases be sufficient to provide a total dosage of from about 10 to about 50 megarads, preferably from 12 to 30 megarads, and at the same time provide a percent gel of from about 30 to about 80. Bodies irradiated at these dosages provide polyethylene foams having very smooth, glossy surfaces; extremely small uniformly distributed, discrete cells substantially spherical in shape. Lower dosages, e.g., 8 megarads and below, result in foams lacking one or more of these highly desirable properties and particularly lacking in fine cell size.

The process of this invention provides foamable polyethylene bodies which upon foaming have extremely small, discrete uniformly distributed cells. The average cell size is usually less than about .003 inch (.075 millimeter) whereas maximum cell size is .008 inch (.20 millimeter) or less. Foams with cell sizes of this order of magnitude have not heretofore been producible with the facility and economy of operation that is inherent in this invention.

The foamable bodies are foamed by heating the body to a temperature above the decomposition temperature of the organic foaming agent. In foaming the bodies of this invention it is highly preferred to use a two stage heating procedure. This involves preheating the body at temperatures slightly below the decomposition temperature of the blowing agent and then rapidly heating to a temperature above the decomposition temperature. This rapid transition from below to above the decomposition temperature gives in general, somewhat lower densities, smaller cell sizes and more uniform cell shape and distribution in the foams produced. It should, however, be fully understood that single stage heating does produce satisfactory foam products within the scope of the invention.

The foamable bodies of this invention, upon heating in the absence of restraint, expand three-dimensionally. Non-irradiated bodies of known polyethylene compositions containing foaming agent expand primarily in one direction (thickness) when heated under foaming conditions. Increase in length and in width is limited to 10 to 15 percent at the most. In contrast, irradiated bodies (e.g., sheets) of this invention expand 25 percent or more (often up to 50–60%) in length and in width, in addition to expanding in thickness. This property is extremely advantageous in forming thermoformed (e.g., vacuum-formed) cups, trays, etc., having uniform thickness distribution.

Cooling of the foam can be accomplished in several different ways. Slow cooling, e.g., by air cooling in ambient atmosphere produces foams having in general smaller cell size and greater thermal stability, i.e., lesser tendency to deform when reheated. Rapid cooling, e.g., by immediately quenching in a bath of cooling liquid, will give foams of slightly lower densities, somewhat larger cell size and increased tendency to shrink upon reheating. It is apparent therefore that the cooling method used will depend primarily upon the foam properties desired.

In quenching, the expanded body is cooled to temperatures below the solidification temperature (also often referred to as the freezing point or crystallization temperature) of the polyethylene material as soon as reasonably possible after the body has reached its point of maximum expansion. As above noted, one satisfactory procedure for quenching is to immerse the foamed body in a bath of cooling liquid, e.g., room temperature water.

Formed structures can be prepared from preshaped foamable bodies by, e.g., vacuum forming. In such process it is usually preferred to perform the foaming, forming, and quenching steps substantially simultaneously, that is, in a manner which for practical purposes affords the lowest possible time lag between these steps. It is most advantageous to foam, immediately form and at the same time quench, i.e., by forming in, or, or around a cold mold.

A preferred method for preparing formed foamed structures involves use of previously foamed shapes, e.g., sheets, using contact heating (e.g., a heated plate) to heat the foam to forming temperatures and positive pressure (e.g., fluid pressure or a male mold element) to force the heated foam sheet into a cold female mold. This procedure gives formed, foamed shapes having properties essentially the same as those of shapes made with the above described vacuum forming technique. The forming method utilizing previously foamed sheets avoids a possible wrinkling problem and thus is usually preferred over the described vacuum forming method.

The following examples are presented to illustrate the various aspects of the invention, without limiting the scope thereof other than as defined in the appended claims. In each of the examples irradiation was accomplished using a General Electric one million volt resonant transformer unit until the indicated dosage was received. The symbol "MR" is used for the megarad dosage unit.

All parts in the examples are parts by weight unless otherwise specified.

Gel percentage of the irradiated samples, where shown, were determined by using the following procedure:

Specimens of irradiated samples weighing between 0.46 and 0.50 gram were weighed to 0.1 milligram and to an accuracy of ±0.05 milligram. Specimens were cut into smaller pieces, approximately 1 square centimeter in size, and transferred to a 22 x 80 millimeter single-thickness Whatman extraction thimble which had been reduced in length by cutting approximately 10 millimeters off of the top. As a precautionary measure to insure against loss of sample in transfer, the thimbles were weighed before and after the samples were added. The samples were then extracted over a 20 hour period in an apparatus designed for ASTM D–147 using toluene (analytical reagent grade) as the solvent.

Upon completion of the extraction, the thimbles were removed and a visual inspection made of the gel. If the gel was found to be in a cohesive form and capable of total removal with forceps, it was transferred directly to aluminum weighing cups and dried under reduced pressure in a vacuum oven at 55–60° centigrade for a period of no less than 48 hours.

If the gel could not be removed without fear of loss to the thimble, then the hot extract was analyzed. It was transferred to evaporating dishes which had previously been weighed to 0.1 milligram. The flasks from which the solution had been transferred were washed twice with 20–25 milliliters of hot toluene and the washings added to the solution. Toluene was partially evaporated while cooling under a hood in air prior to drying under the same conditions as was the gel.

Materials balances of 99.6–101.1% obtained prior to the investigation and from spot checks during the investigation justified the use of sol weight for some samples and the gel weight for others. Gel content was determined directly from the gel whenever possible, as it was found to be a much more convenient procedure.

Determination of cell size in the foamed products was made by microscopic examination.

Melt indices of the polyethylene materials were determined in accordance with the procedure of ASTM–1258–521.

EXAMPLE 1

One-hundred parts of a commercially available, powdered ethylenebutene copolymer (about 95% ethylene) having a density of 0.950 gram per cubic centimeter and a melt index of 9.0 were dry-blended with 3 parts of commercially available azobisformamide blowing agent ("Celogen–AZ") in a Patterson-Kelley twin shell blender for 15 minutes to produce a homogeneous mixture. A portion of the dry blend was compression molded at temperatures below the decomposition temperature of the Celogen AZ into a 9 x 9 x .075-inch plaque in a commercial hydraulic press.

The compression molded plaque was irradiated at room temperature until it had received a dosage of 16 MR.

A circular portion (about 4 inches in diameter) was die cut from the center of the plaque and retained between a pair of circular clamps. The clamped disc was then preheated at a temperature of about 280° Fahrenheit for about 2 to 3 minutes after which it was immediately transferred to a high temperature (59° Fahrenheit) foaming oven. Foaming occurred within about 30 seconds in the high temperature oven. The sample was kept in the foaming oven for a few seconds to permit substantially complete decomposition of the blowing agent, and was then immediately removed from the oven. Quite surprisingly it was noted that during foaming, the disc expanded in a substantial amount in three-dimensions, i.e., there was an increase of 40% or more in the diameter of the disc as well as in thickness. Because of the restraint on diametral expansion due to the circular clamps, the disc expanded into a foamed dome-like bubble. After removal from the oven, the foam was air cooled in the ambient atmosphere.

Samples were cut from the center of the dome for density measurements and examination of foam structure. The sample had density of 0.47 gram per cubic centimeter calculated from a determination of its volume and weight. The surfaces of the foam were smooth and glossy. It was observed by microscopic examination that the average size of cells in the foam was less than .001 inch with a maximum cell size of .002 inch. The cells were substantially spherical in shape and very uniformly distributed. The foam structure was essentially a closed cell structure; i.e., virtually every call was discrete from other cells.

EXAMPLES 2–45

In the following examples, various polyethylene materials were homogeneously admixed with azobisformamide in varying concentrations by dry blending for 20 minutes (as described in Example 1) and compounding the materials in a two-inch twin-screw extruder. The extruded mixtures were pelletized and re-extruded at temperatures of about 300° Fahrenheit or below to form 15 mil or 30 mil (.015 or .030 inch) elongated sheet, 4 to 6 inches wide.

The sheets were irradiated to varying dosages. Thereafter circular discs (about 4 inches in diameter) were die-cut from the irradiated sheet. Each of these disc samples was foamed and then air cooled in the manner described in Example 1. In some of the later examples duplicate samples were prepared and water quenched after foaming. Densities of foamed materials were determined by calculation and pore sizes were determined by microscopic examination. Percent gel was determined only for some examples. The gel values noted provides sufficient representative information.

Results are summarized in Table I following:

TABLE I.—FOAMS MADE FROM IRRADIATED HOMOGENEOUS MIXTURES OF POLYETHYLENE MATERIALS AND AZOBISFORMAMIDE

| Polyethylene material | Amount of foaming agent [1] | Radiation dosage (megarads) | Percent gel | Calculated density (grams per cubic centimeter) | | Average cell size, inches [2] | Cell | uniformity |
|---|---|---|---|---|---|---|---|---|
| | | | | Air cooled | Water quenched | | | |
| Example: | | | | | | | | |
| 2 | A | 2 | 8 | .36 | | | | |
| 3 | A | 2 | 12 | .39 | | | .003 | Good. |
| 4 | A | 2 | 16 | 0 | .48 | | .001 | Excellent. |
| 5 | A | 2 | 20 | .65 | | | .001 | Do. |
| 6 | A | 3 | 8 | .29 | | | .006 | None. |
| 7 | A | 3 | 12 | .29 | | | .002 | Fair. |
| 8 | A | 3 | 16 | .47 | | | .001 | Excellent. |
| 9 | A | 3 | 20 | .47 | | | .001 | Do. |
| 10 | A | 5 | 8 | .23 | | | .006 | Very poor. |
| 11 | A | 5 | 12 | .23 | | | .002 | Fair. |
| 12 | A | 5 | 16 | .23 | | | .001 | Excellent. |
| 13 | A | 5 | 20 | .42 | | | .001 | Do. |
| 14 | A | 7 | 8 | .25 | | | .006 | None. |
| 15 | A | 7 | 12 | .18 | | | .003 | Poor. |
| 16 | A | 7 | 16 | .14 | | | .001 | Excellent. |
| 17 | A | 7 | 20 | .21 | | | .001 | Do. |
| 18 | B | 3 | 50 | 69 | .94 | .74 | .0005 | |
| 19 | B | 3 | 100 | 79 | .96 | .86 | .0005 | |
| 20 | B | 7 | 50 | | .72 | .32 | .0005 | |
| 21 | B | 7 | 100 | | .81 | .54 | .0005 | |
| 22 | B | 15 | 8 | | .29 | .20 | .011 | |
| 23 | B | 15 | 12 | | .26 | .16 | .006 | |
| 24 | B | 15 | 20 | | .33 | .16 | .0005 | |
| 25 | C | 3 | 4 | 0 | .41 | .34 | .010 | |
| 26 | C | 3 | 12 | 36 | .46 | .35 | .006 | |
| 27 | C | 3 | 20 | 40 | .57 | .34 | .0005 | |
| 28 | D | 3 | 8 | | .33 | .22 | .010 | |
| 29 | D | 3 | 12 | 31 | .32 | .27 | .008 | |
| 30 | D | 3 | 20 | 55 | .47 | .35 | .006 | |
| 31 | E | 3 | 8 | | .42 | .39 | .016 | |
| 32 | E | 3 | 12 | | .39 | .34 | .012 | |
| 33 | E | 3 | 20 | | .49 | .41 | .0005 | |
| 34 | F | 3 | 8 | 0 | .36 | | .010 | |
| 35 | F | 3 | 12 | 0 | .36 | .31 | .006 | |
| 36 | F | 3 | 20 | 37.3 | .45 | .34 | .001 | |
| 37 | G | 3 | 8 | | .33 | .24 | .017 | |
| 38 | G | 3 | 12 | | .33 | .29 | .008 | |
| 39 | G | 3 | 20 | | .37 | .29 | .003 | |
| 40 | H | 3 | 8 | | .28 | .28 | .012 | |
| 41 | H | 3 | 12 | | .32 | .25 | .006 | |
| 42 | H | 3 | 20 | | .39 | .32 | .001 | |
| 43 | I | 3 | 8 | | .58 | .43 | .012 | |
| 44 | I | 3 | 12 | | .38 | .48 | .005 | |
| 45 | I | 3 | 20 | | .59 | .51 | .005 | |

[1] Parts per 100 parts of polyethylene material.
[2] Determined by microscopic examination. Values are for air cooled samples.

NOTE.—Polyethylene materials:
A Ethylene-butene copolymer of Example I, .95 density, 9.0 melt index.
B Ethylene-butene copolymer, .95 density, 5.0 melt index.
C Ethylene homopolymer, .96 density, 5.0 melt index.
D Ethylene homopolymer, .933 density, 3.0 melt index.
E Ethylene homopolymer, .96 density, 3.0 melt index.
F Ethylene homopolymer, .96 density, 3.0 melt index, thermally cracked to about 40 melt index.
G Ethylene homopolymer, .96 density, 3.0 melt index, thermally cracked to about 15 melt index.
H Ethylene-butene copolymer, .95 density, 3.0 melt index, thermally cracked to about 15 melt index.
I Ethylene-butene copolymer, .95 density, 0.5 melt index.

EXAMPLES 46–51

In the following examples the procedure was essentially the same as that used in Examples 2 through 45. The polyethylene material was the ethylene-butene copolymer designated as material B in Table 1. The organic foaming agent was azobisformamide. In these examples the homogeneous admixtures comprised 3 parts of azobisformamide, from 10 to 40 parts of commercially available styrene homopolymer and, correspondingly, from 57 to 87 parts of the above polyethylene material.

The results are summarized in Table II.

TABLE II

| | Parts of polystyrene | Dosage | Percent gel | Average cell size, inches | Air cooled density | Water quencher density |
|---|---|---|---|---|---|---|
| Example: | | | | | | |
| 46 | 10 | 12 | | .002 | .39 | .33 |
| 47 | 10 | 20 | | .001 | .42 | .33 |
| 48 | 20 | 12 | 6.3 | .006 | .36 | .34 |
| 49 | 20 | 20 | | .002 | .38 | .35 |
| 50 | 40 | 12 | | .006 | .49 | .45 |
| 51 | 40 | 20 | | .010 | .40 | .38 |

The addition of 10–30% by weight of polystyrene greatly increased the stiffness of the foams produced without materially affecting other foam properties. Polystyrene in amounts higher than 30% (e.g., 40%) were unsatisfactory because there appeared to be no significant increase in stiffness and an undesired increase in brittleness.

The small cell size of the foams of this invention provides greater impact strength, greater flexibility and higher tensile strength as compared to foams of similar density but with larger pore sizes.

We claim:
1. A process for preparing polyethylene foam comprising:
   (a) forming an intimate homogeneous mixture consisting essentially of:
      (1) a normally solid polyethylene material;
      (2) a heat responsive foaming agent;
   (b) forming said mixture into at least one body;
   (c) preheating said body uniformly to a particular temperature slightly below the decomposition point of the foaming agent and maintaining said body at said particular temperature until equilibrium is reached;
   (d) in a definite separate part of the heating procedure rapidly heating said already preheated body to a temperature well above said decomposition point to form an expanded body, and
   (e) cooling the heated body to a temperature below the freezing point of the polyethylene material.
2. The process of claim 1 wherein said normally solid polyethylene material is subjected to high energy ionizing radiation.

3. The process of claim 2 wherein radiation is carried out in an amount sufficient to provide a dosage of from about 10 to about 50 megarads and to produce a percent gel of from about 30 to about 80 in the irradiated material.

4. The process of claim 3 wherein said heat responsive foaming agent is a normally solid heat decomposable organic agent having a decomposition temperature of at least about 10° C. above the melting point of the normally solid polyethylene material, said foaming agent present in an amount of from 1 to about 15 parts by weight per 100 parts of said normally solid polyethylene material.

5. The process of claim 4 wherein said irradiated, expanded body is then reheated to a temperature suitable for forming and substantially simultaneously formed and quenched.

References Cited

UNITED STATES PATENTS

| | | | |
|---|---|---|---|
| 2,948,665 | 8/1960 | Rubens et al. | 204—159.2 |
| 3,098,831 | 7/1963 | Carr | 260—2.5 |
| 3,098,832 | 7/1963 | Pooley et al. | 204—159.2 |

MURRAY TILLMAN, Primary Examiner

W. J. BRIGGS, SR., Assistant Examiner

U.S. Cl. X.R.

204—159.2; 260—94.9GA, 94.9R; 260—54, 55